United States Patent [19]

Steinshorn

[11] Patent Number: 4,894,762
[45] Date of Patent: Jan. 16, 1990

[54] METHOD AND APPARATUS TO AVOID COMMUTATION FAILURE IN A REGENERATIVE CONVERTER

[75] Inventor: Axel Steinshorn, Wittighausen, Fed. Rep. of Germany

[73] Assignee: Siemens Aktiengesellschaft, Munich, Fed. Rep. of Germany

[21] Appl. No.: 350,310

[22] Filed: May 11, 1989

[30] Foreign Application Priority Data

Aug. 3, 1988 [DE] Fed. Rep. of Germany ....... 3826402

[51] Int. Cl.$^4$ .......................... H02M 5/44; H02H 7/00
[52] U.S. Cl. ......................................... 363/35; 363/51; 363/138
[58] Field of Search ...................... 363/35, 37, 51, 137, 363/138, 87, 96

[56] References Cited

U.S. PATENT DOCUMENTS

| | | | |
|---|---|---|---|
| 3,737,763 | 6/1973 | Chadwick | 363/51 |
| 4,028,607 | 6/1977 | Watanabe | 363/51 |
| 4,161,010 | 7/1979 | Mann et al. | 363/138 |
| 4,183,081 | 1/1980 | Cutler et al. | 363/138 |
| 4,208,691 | 6/1980 | Rogowsky | 363/51 |
| 4,238,821 | 12/1980 | Walker | 363/138 |

*Primary Examiner*—Peter S. Wong
*Attorney, Agent, or Firm*—Kenyon & Kenyon

[57] ABSTRACT

A method and apparatus to avoid commutation failure in a regenerative converter of a supply reversible converter of a voltage-source converter, in case of dynamic voltage depression. A firing control of the reversible converter is a function of the value of a link current setpoint of the voltage-source converter. The link current setpoint is determined from a measured link voltage actual value and from a determined link voltage setpoint. A measured link current actual value is monitored for overcurrent. Control signals are supplied to the reversible converter even when there is an overcurrent status message, when the reversible converter is switched over. The reversible converter of the voltage-source converter is thereby protected from commutation failure.

6 Claims, 2 Drawing Sheets

METHOD AND APPARATUS TO AVOID COMMUTATION FAILURE IN A REGENERATIVE CONVERTER

FIELD OF THE INVENTION

The present invention relates to a circuit and method to avoid commutation failure in a regenerative converter of a supply reversible converter of a voltage-source converter, during dynamic voltage depression or during a system voltage dip. In such a voltage-source converter, a firing control of the regenerative converter or a supply converter of the supply reversible converter is a function of the value of a link current setpoint of the voltage-source coverter. The link current setpoint is generated from a measured link voltage actual value and from a controllable link voltage setpoint, while a measured link current setpont is monitored for overcurrent.

BACKGROUND OF THE INVENTION

Voltage-source converters are available commercially which have a supply reversible converter, a voltage source and a load-side converter. The reversible converter comprises an inverse-parallel connection of two converters in three-phase bridge connection, with one converter being a supply converter responsible for controlling the power from the supply system to the load. The other converter is a regenerative converter responsible for controlling the power from the load to the supply system. For the load, for example, a polyphase machine is provided as a driving mechanism.

With a motor-operated polyphase machine, the supply converter is triggered in rectifier operation, whereby the power from the supply system reaches the load. In generator operation of the polyphase machine, the regenerative converter is controlled in inverter operation, whereby power is fed back to the supply system.

To prevent commutation failure in the regenerative converter, before the transition is made from motor to generator operation, the link voltage is lowered by a setpoint correction of the link voltage. The link voltage is lowered, for example, by 15%. However, in dynamic load changes, for example reversing operations, the link voltage cannot be lowered quickly by means of a setpoint correction. This means that the regenerative converter is triggered in inverter operation with an even higher link voltage. If the link voltage is too high, an overcurrent will occur which causes control signals from a control system to no longer reach the converter valves of the regenerative converter. Therefore, the conducting converter valves cannot supply the current to the follower converter valves of the regenerative converter. This means that the regenerative converter falls out of synchronism. Also, during triggering of the regenerative converter, an overcurrent can occur as a result of a system voltage dip when feeding back the power from the load to the supply system. As a result of the suppression of the control signals by the control, the regenerative converter will therefore fall out of synchronism.

This commutation failure is prevented in conventional voltage-source converters, because the voltage-source converters are always controlled in dynamic operation with lowered link voltage. The result is that the full power of the voltage-source converter cannot be utilized for the load.

Another way to avoid commutation failure is by coupling the regenerative converter of the reversible converter to the power supply with a high-performance transformer. In this way, the link voltage can be controlled to its nominal value. However, the high-preformance transformer and the reversible converter must be designed for a higher supply voltage.

There is thus a need for a circuit and a method to prevent commutation failure in a reversible converter without operating the voltage-source converter with lowered link voltage, and without having to design the reversible converter with a high-performance transformer for higher supply voltage.

SUMMARY OF THE INVENTION

This need is met according to the present invention which provides that control signals are supplied to the regenerative converter of a reversible converter, even if an overcurrent status message is present, when a switch is made from supply converter to the regenerative converter, or during the operation of the regenerative converter. Since control signals are supplied to the conducting converter valve pair and to the following valve pair of the regenerative converter in spite of the overcurrent status message, the conducting valve pair can supply the current to the following valve pair. Thus, the current commutates and the converter cannot fall out of synchronism. The amplitude of the overcurrent can once again be controlled, as a result of the quickly falling, (e.g. 10 ms), link voltage. The time it takes for the link voltage to fall depends on the capacitance and the inductance of the link. In this process, the overcurrent status message is ignored, so that the current can commutate, whereby the valves for dynamic transitions are adjusted by measuring.

A voltage-source converter is thereby provided which remains in operation when there are dynamic load changes, so that the total installed power is available to the load. This means the rated link voltage is applied to the link, and a commutation failure is prevented in the feedback operation.

An apparatus for preventing commutation failure is a regeneration converter of a voltage source converter is also provided by the present invention. The voltage source converter has a load-side converter, a link with a link voltage-level director and a link current level detector, and a supply reversible converter. The supply reversible converter has a supply converter and a regenerative converter. A first summing element has inputs and an output, with the inputs being coupled to receive a controllable link voltage setpoint and a measured link voltage actual valve. A voltage regulator has an input coupled to the first summing element, and an output at which a link current setpoint is produced. A second summing element has a first input coupled to the voltage regulator output, and a second input coupled to an output of the link current-level detector, and an output. A sequential logic module has a first input coupled to the output of the link current-level detector, a second input coupled to the voltage regulator output, and an output. A current regulator has an input coupled to the second summing element, and an output. A firing-circuit subassembly has an input that is coupled to the current regulator output, and an output. A changeover switch has an input coupled to the firing-circuit subassembly output, a control input coupled to the sequential logic module by which the changeover switch is controlled, a first output coupled to the supply converter to provide valve control signals to the supply converter, and a second output coupled to the regeneration converter to provide valve control signals to the regenerative converter.

The apparatus according to the present invention enables control signals to be supplied to the valves of the regenerative converter, in spite of an overcurrent status message, so that the conducting valve pair can supply current to the following valve pair in the regenerative converter. Thus, the regenerative converter can no longer fall out of synchronism. This ignoring of an overcurrent status message functions during dynamic load changes and supply system voltage dips.

A microprocessor is provided as a controlling system in an embodiment of the present invention. In this embodiment, the functions of individual circuit elements are implemented by subroutines of a program. This means that the response characteristic of each circuit element of the controlling system is representable by a transfer function, from which each output variable of each circuit element can be calculated. Analog-digital converters are installed at the interface to the voltage-source converters. As a function of an internal clock, the microprocessor scans the intermediate circuit actual value and the link voltage action value and, with the help of an input subroutine, calculates the link voltage setpoint, the link current setpoint, the delay angle and the switch position of the changeover switch. At this point, the selection is made of whether the supply converter or the regenerative converter of the reversible converter of the voltage-source converter should be triggered. These calculations and the loading of delay angle always take place in the interval between two instances of commutation. Using a microprocessor as a controlling system provides for a flexible controlling system. By modifying the controller parameters in the program, the controlling system can be adapted to each voltage-source converter or to its load.

DETAILED DESCRIPTION

Figure 1:
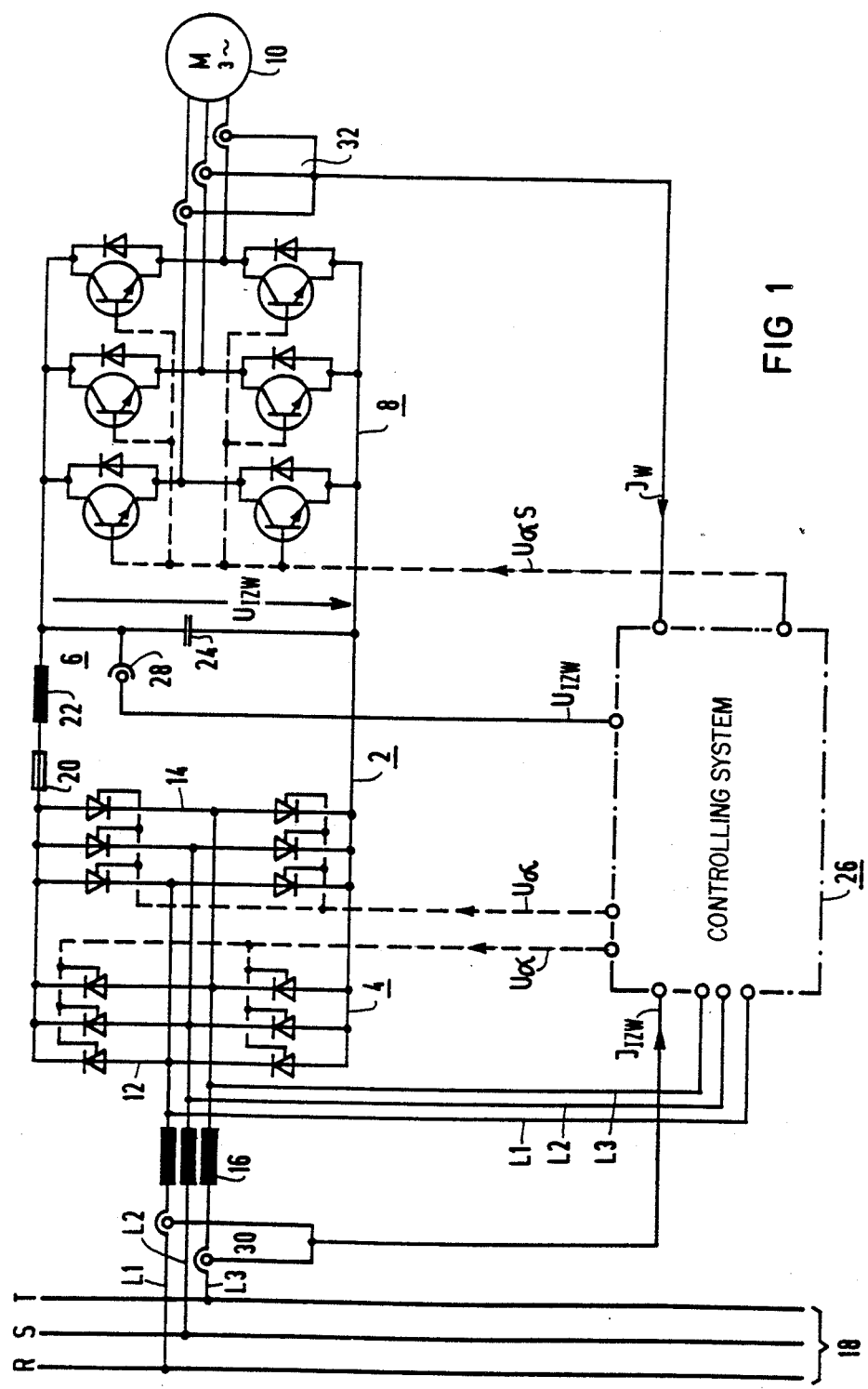
FIG. 1 schematically shows a voltage-source converter with corresponding controlling system constructed in accordance with an embodiment of the present invention.

FIG. 1 illustrates a voltage-source converter 2 comprising a supply reversible converter 4, a voltage source 6 and a load-side converter 8. A load 10 is coupled to the output of the load-side converter 8. The reversible converter 4 has a supply converter 12 and a regenerative converter 14, which are both constructed as three-phase bridge connections. The supply converter 12 and the regenerative converter 14 are connected in inverse-parallel fashion. The reversible converter 4 is coupled in an electrically conductive manner to a supply system 18. The voltage source 6 is coupled to the output of the reversible converter 4 and contains a link fuse 20, a link inductor 22 and a link capacitor 24. A link voltage $U_{IZW}$ is applied to the link capacitor 24. The load-side converter 8 is supplied by the voltage source 6.

The control signals $U_\alpha$ for the supply converter 12 and the regenerative converter 14, and the control signal $U_{\alpha s}$ for the load-side converter 8 are generated by a controlling system 26. The part of the controlling system 26 which generates the control signals $U_\alpha$, is shown in greater detail in FIG. 2 as a block diagram and will be explained later. The part of the controlling system 26, which generates the control signals $U_{\alpha s}$ for the converter 8, has not been depicted in greater detail for clarity's sake, since it is conventional.

A link voltage action value $U_{IZW}$, a link current setpoint $I_{IZW}$ and a load current $I_W$ are supplied to the controlling system 26, so that control signals $U_\alpha$ and $U_{\alpha s}$ can be generated. The link voltage actual value $U_{IZW}$ is measured by a link voltage-level detector 28, and the link current actual value $I_{IZW}$ is measured by a link current-level detector 30. The link current-level detector 30 is mounted on the a.c. side of the reversible converter 4, and the link current actual value $I_{IZW}$ is calculated from two phase currents. The load current $I_W$ is measured by a detector 32. In addition, lines L1, L2 and L3 supply the line voltages to the controlling system 26.

Figure 2:
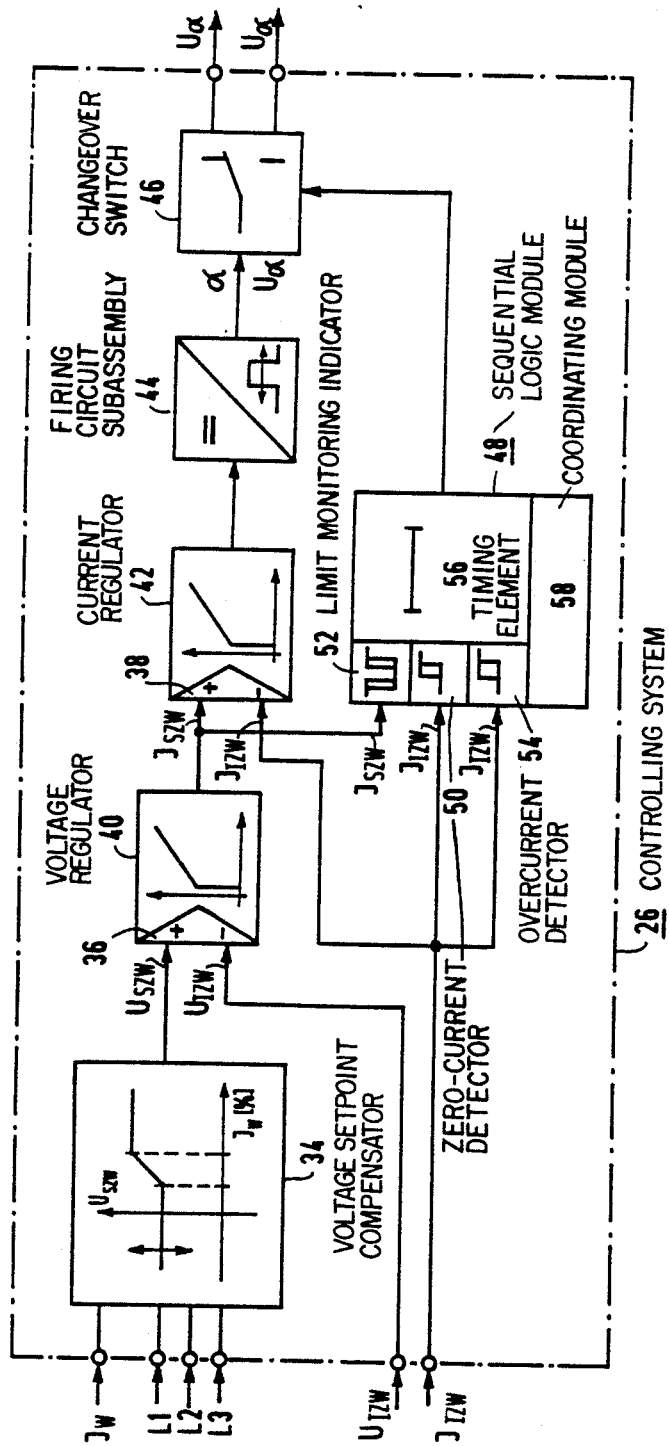
FIG. 2 illustrates in block diagram form a portion of the controlling system of FIG. 1.

FIG. 2 illustrates an embodiment of the controlling system 26 of FIG. 1 in block diagram form. The controlling system 26 contains a link voltage setpoint compensator 34, first and second summing elements 36 and 38, a voltage regulator 40, a current regulator 42, a firing-circuit subassembly 44, a changeover switch 46 and a sequential logic module 48.

The link voltage setpoint compensator 34 is illustrated as a signal characterizer. Its characteristic curve can be shifted horizontally (indicated by a double arrow), as a function of the amplitude of the line voltage. The characteristic curve represents the function $U_{SZW}(I_W)$, where the load current $I_W$ is specified as a percentage.

The link voltage setpoint compensator 34 produces as a function of the load current $I_W$ and the amplitude of the line voltage, a link voltage setpoint $U_{SZW}$ that is supplied to a first input of the first summing element 36. The measured link voltage actual value $U_{IZW}$ is applied to the second input of the first summing element 36. A system deviation $U_{SZW} - U_{IZW}$ is determined by the summing element 36. From this system deviation, a link current setpoint $I_{SZW}$ is generated by the voltage regulator 40. An active proportional integral controller, also called a PI controller, is provided as the voltage regulator 40.

The output of the PI controller of voltage regulator 40 is coupled with a first input of the second summing element 38 to provide the link current setpoint $I_{SZW}$, and the measured link current actual value $I_{IZW}$ is applied to the second input of the second summing element 38. The generated system deviation $I_{SZW} - I_{IZW}$ is supplied to the current regulator 42. A PI controller is used as a current regulator 42 in the illustrated embodiment.

At its output, the current regulator 42 is coupled to the firing-circuit subassembly 44. The changeover switch 46 is coupled to the output of the firing-circuit subassembly 44. A delay angle $\alpha$ or a control signal $U_\alpha$ is generated by the firing-circuit subassembly 44, as a function of the output current of the current regulator 42. By means of the changeover switch 46, which is controllable by the sequential logic module 48, the control signal $U_\alpha$ is supplied to the converter valves of the supply converter 12 or the regenerative converter 14.

The sequential logic module 48 contains a zero-current detector 50, a limit monitoring indicator 52, an overcurrent detector 54, a timing element 56 and a coordinating module 58. By means of the sequential logic module 48, the measured link current actual value $I_{IZW}$ is monitored for zero current and overcurrent. The sequential logic module 48 also simultaneously monitors the link current setpoint $I_{SZW}$ for a limiting value. The coordinating module 458 evaluates the zero-current detector 54. This result is transmitted with a time delay to the changeover switch 46, whereby the control signal $U_\alpha$ generated by the firing-circuit subassembly 44, is supplied to the supply converter 12 or to the regenerative converter 14. The zero-current detector 50 can be a comparator, the limit monitoring indicator 52 a window comparator, the overcurrent detector 54 a comparator, and the timing element 56 an edge-triggered, monostable sweep circuit in the illustrated embodiment of the invention. A logic circuit can serve as a coordinating module 58.

In an embodiment of the invention, this part of the controlling system 26 or the entire controlling system 26 is a microprocessor. The illustrated individual functional blocks of the controlling system 26 are then encoded as program parts or subroutines in the microprocessor. The actual values supplied by the voltage-source converter 2 to the controlling system 26 are converted by an analog-digital converter, and the generated delay angle $\alpha$ is supplied to the voltage-source converter 2. In the interval between two instants of commutation, a delay angle $\alpha$ is calculated as a function of the load current $I_W$, the link current action value $I_{IZW}$, and the link voltage actual value $U_{IZW}$. The computing time is shorter than the time lag between two instants of commutation. Using a microprocessor provides for a universal controlling system 26, since the controlling system 26 can be synchronized with any voltage-source converter 2 by exchanging the program, which, as is generally known, can be stored in a read-only memory storage ROM.

There are two instances in the operation of a link converter 2 when controlling a reversible converter 4, which can cause the regenerative converter 14 of the reversible converter 4 to fall out of synchronism. One cause can be system voltage dips, which occur when the power is fed back from the load of the supply system 18 during the switchover from supply converter 12 to regenerative converter 14. The other cause is the feeding back to the supply system 18 of too high of a link voltage $U_{IZW}$, during the switchover from supply converter 12 to regenerative converter 14.

As a result of a system voltage dip, the link voltage $U_{IZW}$ also dips, whereby the link current actual value $I_{IZW}$ quickly rises. An overcurrent status message is generated as soon as the link current actual value $I_{IZW}$ reaches a limiting value. The coordinating module 58 registers this status message and simultaneously interrogates the link current setpoint $I_{SZW}$. In other words, a signal is applied to the coordinating module 58 from the limit monitoring indicator 52, indicating that the regenerative converter 14 is being triggered. Under these conditions, the overcurrent detector 54 ignores the overcurrent status message, so that additional control signals $U_\alpha$ can still be transmitted to the converter valves of the regenerative converter 14. In this way, the current can continue to commutate, so that the regenerative converter 14 cannot fall out of synchronism. Furthermore, as a result of the intervention of the controlling system 26, the overcurrent can be limited in as little as ms.

During dynamic operation or reversing operations of the polyphase machine, the energy supply from the supply system to the load is reversed in the shortest possible time. This has as the result that for an even higher link voltage $U_{IZW}$, the reversible converter 4 is switched over to inverter operation, so that the switch is made from the supply converter 12 to the regenerative converter 14. The sequential logic module 48 of the controlling system 26 can recognize such an operation because the zero-current detector 50 generates a signal, as soon as the link current actual value $I_{IZW}$ reaches zero and the limit monitoring indicator 52 supplies a signal that indicates that the regenerative converter 14 is being triggered. Under these conditions, any subsequent overcurrent message, resulting from the current rise, is ignored, so that the current in the converter 14 can commutate.

Thus, a method and a circuit is provided which avoids commutation failure in a supply reversible converter 4 of a voltage-source converter 2 during dynamic operation or during system voltage dips.

What is claimed:

1. A method of preventing commutation failure in a regenerative converter of a supply reversible converter of a voltage-source converter during dynamic voltage depression or during a system voltage dip, with control of the firing of the regenerative converter and of a supply converter of the supply reversible converter being a function of the value of a link current setpoint of the voltage-source converter, the method comprising the steps:

generating the link current setpoint from a measured link voltage actual value and a controllable link voltage setpoint;

monitoring a measured link current setpoint to detect overcurrent;

generating an overcurrent status message when overcurrent is detected; and supplying control signals to the regenerative converter regardless of the presence of an overcurrent status message, when either a switch in current conduction is made from the supply converter to the regenerative converter, or during operation of the regenerative converter.

2. The method of claim 1, wherein the link voltage setpoint is adjustable as a function of a voltage level of a supply system of the supply reversible converter, and of a load current, said load current being controllable by the load-side converter.

3. An apparatus for preventing commutation failure in a regenerative converter of a voltage source converter, the voltage source converter having a load-side converter, a link with a link voltage-level detector and a link current-level detector, and a supply reversible converter, the supply reversible converter having a supply converter and the regenerative converter, the apparatus comprising:

a first summing element having inputs and an output, the inputs being coupled to receive a controllable link voltage setpoint and a measured link voltage actual value;

a voltage regulator having an output coupled to the first summing element output, and an output at which an link current setpoint is produced;

a second summing element having a first input coupled to the voltage regulator output, and a second input coupled to an output of the link current-level detector, and an output a sequential logic module having a first input coupled to the output of the link current level detector, a second input coupled to the voltage regulator output, and an output;

a current regulator having an input coupled to the second summing element output, and an output;

a firing-circuit subassembly having an input coupled to the current regulator output, and an output; and a changeover switch having an input coupled to the firing-circuit subassembly output, a control input coupled to the sequential logic module output by which the changeover switch is controlled, a first output coupled to the supply converter to provide valve control signals to the supply converter, and a second output coupled to the regenerative converter to provide valve control signals to the regenerative converter.

4. The apparatus of claim 3, wherein the functions of the first and second summing elements, the voltage regulator, the current regulator, the sequential logic module, the firing-circuit subassembly and the changeover switch are implemented by a microprocessor.

5. The apparatus of claim 3, wherein the sequential logic module includes a zero-current detector, a limit monitoring indicator, an overcurrent detector, a timing element and a coordinating module.

6. The apparatus of claim 3, further comprising a link voltage-setpoint compensator coupled to an input of the first summing element, the compensator having inputs which receive voltages of the supply system, wherein the compensator is a controllable voltage-current signal characterizer.

* * * * *